US012687727B2

(12) United States Patent
Faunce

(10) Patent No.: US 12,687,727 B2
(45) Date of Patent: Jul. 21, 2026

(54) TECHNIQUES FOR OPTIMIZING A DISPLAY LOCATION FOR DISPLAYING AUGMENTED-REALITY (AR) CONTENT USING AR GLASSES, AND DEVICES AND METHODS OF USING SUCH TECHNIQUES

(71) Applicant: Meta Platforms Technologies, LLC, Menlo Park, CA (US)

(72) Inventor: Jonathan Faunce, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 19/260,077

(22) Filed: Jul. 3, 2025

(65) Prior Publication Data

US 2026/0010008 A1 Jan. 8, 2026

Related U.S. Application Data

(60) Provisional application No. 63/667,604, filed on Jul. 3, 2024.

(51) Int. Cl.
G02B 27/01 (2006.01)
G06V 20/50 (2022.01)
(52) U.S. Cl.
CPC ..... G02B 27/0172 (2013.01); G02B 27/0176 (2013.01); G06V 20/50 (2022.01)

(58) Field of Classification Search
CPC ........... G02B 27/0172; G02B 27/0176; G02B 27/0093; G02B 2027/0178; G06V 20/50
See application file for complete search history.

(56) References Cited

U.S. PATENT DOCUMENTS

2019/0238818 A1* 8/2019 Held ..................... H04N 13/139
2022/0020192 A1* 1/2022 Kaehler ............. G02B 27/0172

* cited by examiner

*Primary Examiner* — Chanh D Nguyen
*Assistant Examiner* — Gloryvid Figueroa-Gibson
(74) *Attorney, Agent, or Firm* — Morgan, Lewis & Bockius LLP

(57) ABSTRACT
An example method of optimizing a display location for displaying augmented-reality (AR) content is provided. The method includes operations performed at an AR device having a lens display for displaying the AR content. The method includes determining, based on imaging data obtained about physical surroundings of the AR glasses, whether to present the AR content at an optimized display location of the lens of the AR device. The optimized display location is determined based on: (i) minimizing an occlusion factor, (ii) increasing depth-switching demands of the user, (iii) minimizing eye strain of the user, and (iv) optimizing an eyebox position of the AR content such that the amount of AR content subject to display clipping based on fitment factors of individual users is minimized. The method includes, when determining the physical surroundings satisfy one or more viewing criteria, causing display of the AR content at the optimized display location.

20 Claims, 9 Drawing Sheets

400 ⌐

410 At an augmented-reality (AR) glasses device having a lens display for displaying AR content within a portion, less than all, of a lens of the AR glasses device:

420 Determine, based on imaging data obtained about physical surroundings of the AR glasses device, whether to present the AR content at an optimized display location.

430 The optimized display location is based on angle of rotation of the AR glasses device.

440 The optimized display location is offset towards the center of the AR glasses device.

450 The optimized display location is identified within a predefined safe display space within the lens of the AR glasses device.

460 In accordance with determining that the physical surroundings satisfy one or more safety criteria, cause display of the AR content at the optimized display location.

MR system 300c

MR system 300c

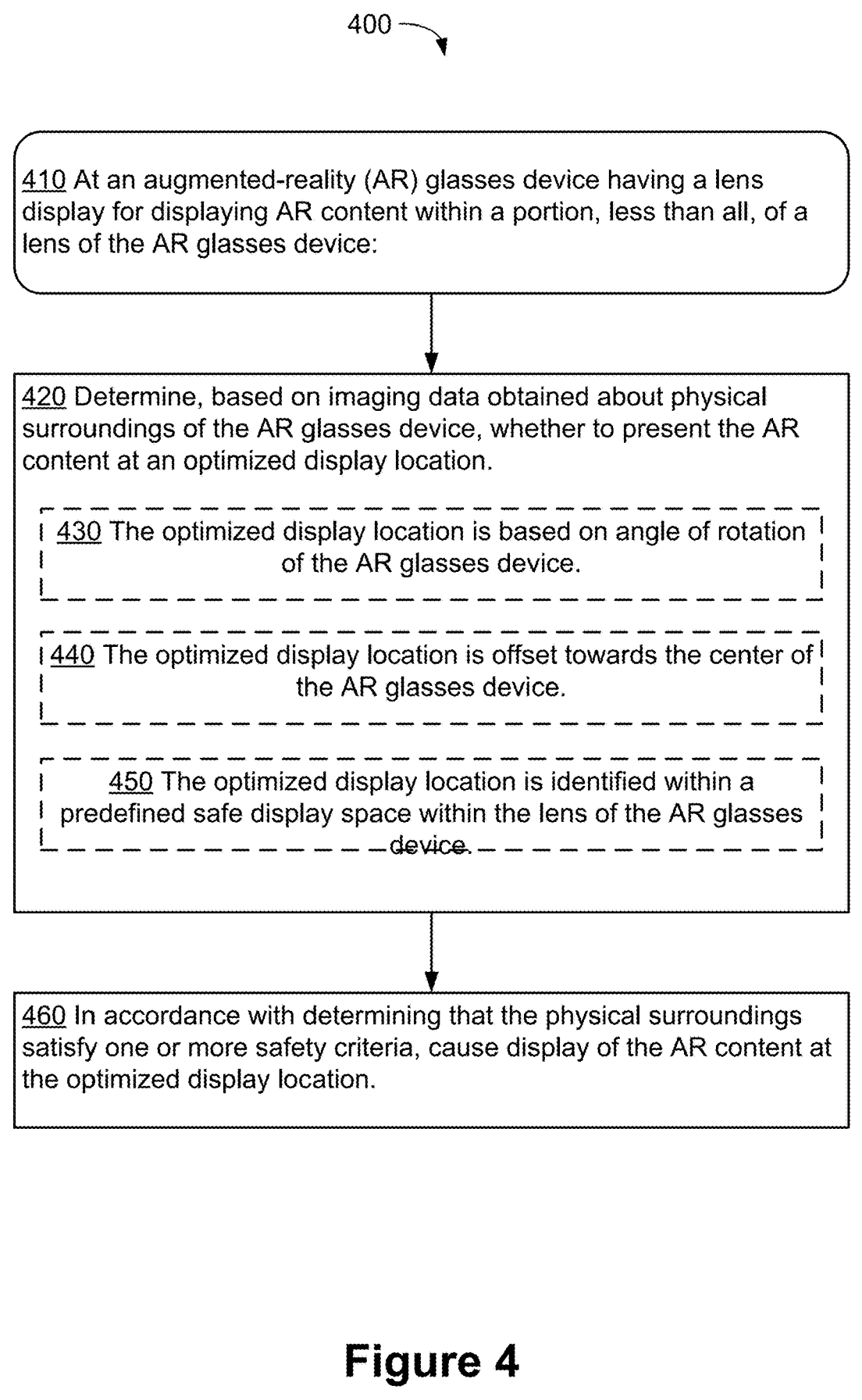

400

410 At an augmented-reality (AR) glasses device having a lens display for displaying AR content within a portion, less than all, of a lens of the AR glasses device:

420 Determine, based on imaging data obtained about physical surroundings of the AR glasses device, whether to present the AR content at an optimized display location.

430 The optimized display location is based on angle of rotation of the AR glasses device.

440 The optimized display location is offset towards the center of the AR glasses device.

450 The optimized display location is identified within a predefined safe display space within the lens of the AR glasses device.

460 In accordance with determining that the physical surroundings satisfy one or more safety criteria, cause display of the AR content at the optimized display location.

Figure 4

TECHNIQUES FOR OPTIMIZING A DISPLAY LOCATION FOR DISPLAYING AUGMENTED-REALITY (AR) CONTENT USING AR GLASSES, AND DEVICES AND METHODS OF USING SUCH TECHNIQUES

RELATED APPLICATIONS

This application claims priority to U.S. Prov. App. No. 63/667,604, filed on Jul. 3, 2024, and entitled "Techniques for Optimizing a Display Location for Displaying Augmented-Reality (AR) Content Using AR Glasses, and Devices and Methods of Using Such Techniques," which is incorporated herein by reference.

TECHNICAL FIELD

This relates generally to display augmented-reality (AR) content, and specifically to optimizing a display location of AR content within the AR glasses.

SUMMARY

The inventors of the present application uniquely identified solutions for displaying AR content to users that are also viewing portions of their physical surroundings (e.g., simultaneously, or concurrently, with viewing the AR content) while accounting for such issues as binocular rivalry, safety requirements, fitment, and/or integrating the AR content with elements of the user's physical surroundings. In other words, the inventors identified a "display safe space" that minimizes deleterious effects of other display locations while optimizing for certain innate aspects of human vision. To solve the problems discussed above the inventors of the present application have uniquely identified the solutions discussed below.

One example method at a head-wearable device (e.g., augmented-reality and/or mixed-reality headsets) is described herein. The method includes, at an augmented-reality (AR) glasses device having a lens display for displaying AR content within a portion, less than all, of a lens of the AR device, determining, based on data obtained about physical surroundings of the AR glasses, whether to present the AR content at an optimized display location of the lens of the AR device. And the example method further includes, in accordance with determining that the physical surroundings satisfy one or more safety criteria, causing display of the AR content at the optimized display location.

Instructions that cause performance of the methods and operations described herein can be stored on a non-transitory computer readable storage medium. The non-transitory computer-readable storage medium can be included on a single device or across multiple devices of a system. A non-exhaustive of list of devices that can either alone or in combination (i.e., a system) perform the method and operations described herein include extended-reality headset (e.g., a mixed-reality (MR) headset or an augmented-reality (AR) headset as two examples), a wrist-wearable device, an intermediary processing device, a smart textile-based garment, etc.). For instance, the instructions can be stored on an AR headset or can be stored on a combination of an AR headset and an associated input device (e.g., a wrist-wearable device) such that instructions for causing detection of input operations can be performed at the input device and instructions for causing changes to a displayed user interface in response to those input operations can be performed at the AR headset. The devices and systems described herein can be configured to be used in conjunction with methods and operations for providing an extended-reality experience. The methods and operations for providing an extended-reality experience can be stored on a non-transitory computer-readable storage medium.

The devices and/or systems described herein can be configured to include instructions that cause performance of methods and operations associated with the presentation and/or interaction with an extended-reality. These methods and operations can be stored on a non-transitory computer-readable storage medium, which can be included on the device. It is also noted the devices and systems described herein can be part of a larger overarching system that include multiple devices. A non-exhaustive of list of devices that can either alone or in combination (i.e., a system) include instructions that cause performance of methods and operations associated with the presentation and/or interaction with an extended-reality include: an extended-reality headset (e.g., a mixed-reality (MR) headset or an augmented-reality (AR) headset as two examples), a wrist-wearable device, an intermediary processing device, a smart textile-based garment, etc. For example, when a XR headset is described as, it is understood that the XR headset can be in communication with one or more other devices (e.g., a wrist-wearable device, a server, intermediary processing device, etc.) which in together can include instructions for performing methods and operations associated with the presentation and/or interaction with an extended-reality (i.e., the XR headset would be part of a system that includes one or more additional device). Multiple combinations with different related devices are envisioned, but not recited for brevity.

The features and advantages described in the specification are not necessarily all inclusive and, in particular, certain additional features and advantages will be apparent to one of ordinary skill in the art in view of the drawings, specification, and claims. Moreover, it should be noted that the language used in the specification has been principally selected for readability and instructional purposes.

Having summarized the above example aspects, a brief description of the drawings will now be presented.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIG. 4 shows a flow chart illustrating an example method of optimizing a display location for displaying AR content using AR glasses, in accordance with some embodiments.

Figure 1A:
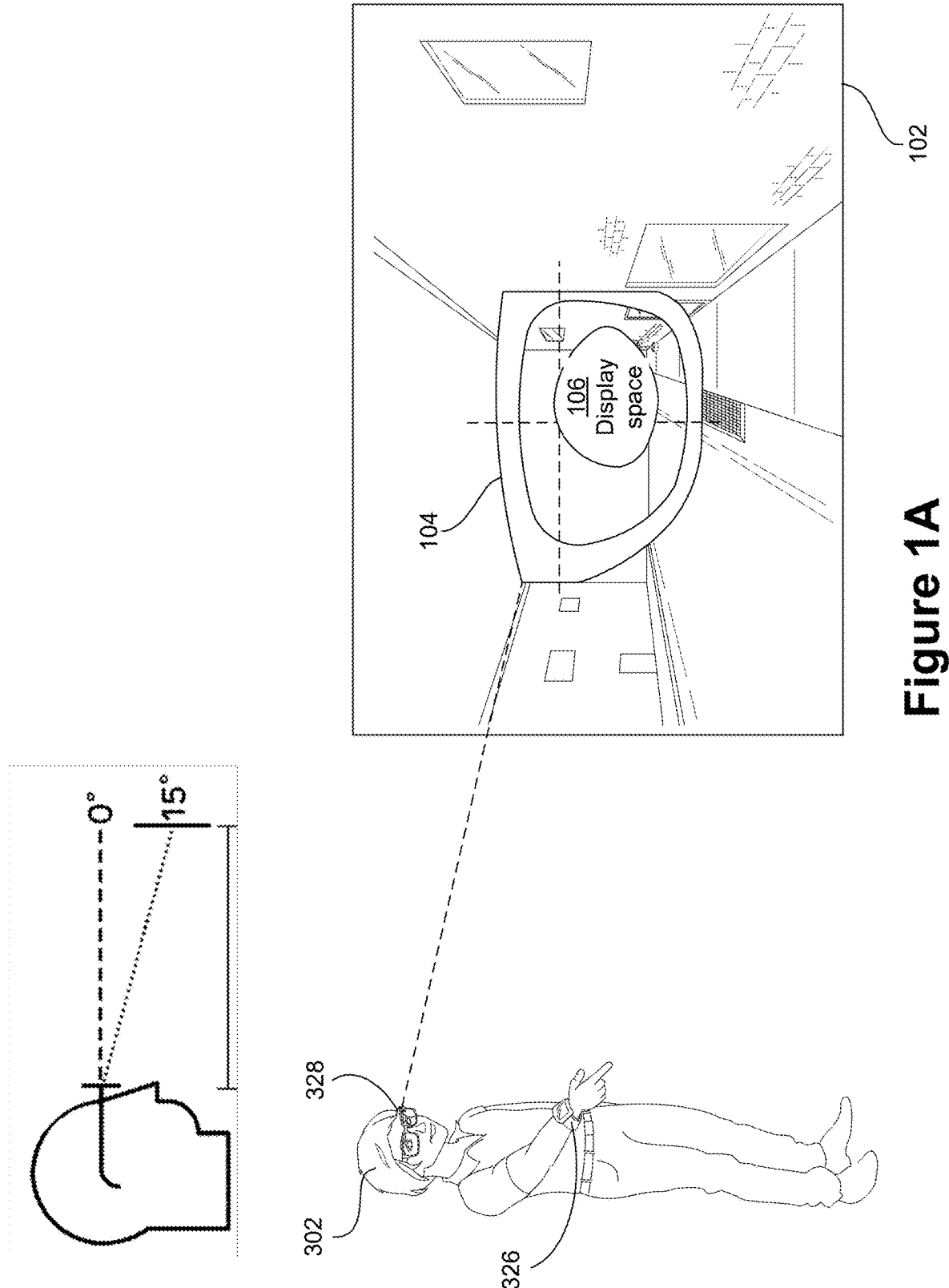
FIGS. 1A to 1D illustrates example AR content displayed within portions of an AR glasses device, in accordance with some embodiments.

In accordance with customary practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DETAILED DESCRIPTION

Numerous details are described herein to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not necessarily been described in exhaustive detail so as to avoid obscuring pertinent aspects of the embodiments described herein.

Embodiments of this disclosure can include or be implemented in conjunction with distinct types or embodiments of extended-realities (XR) such as mixed-reality (MR) and augmented-reality (AR) systems. Mixed-realities and augmented-realities, as described herein, are any superimposed functionality and or sensory-detectable presentation provided by a mixed-reality and augmented-reality systems within a user's physical surroundings. Such mixed-realities can include and/or represent virtual realities and virtual realities in which at least some aspects of the surrounding environment are reconstructed within the virtual environment (e.g., displaying virtual reconstructions of physical objects in a physical environment to avoid the user colliding with the physical objects in surrounding physical environment). In the case of mixed-realities, the surrounding environment that is presented is captured via one or more sensors configured to capture the surrounding environment (e.g., a camera). While the wearer of a mixed-reality headset may see the surrounding environment in full detail, they are seeing a reconstruction of the environment reproduced via the one or more sensors (i.e., the physical objects are not directly viewed by the user). A MR headset can also forgo displaying reconstructions of objects in the physical environment, thereby providing a user with an entirely virtual reality (VR) experience. An AR system, on the other hand, provides an experience in which information is provided, e.g., through the use of a waveguide, in conjunction with the direct viewing of at least some of the surrounding environment through a transparent or semi-transparent waveguide(s) and/or lens(es). Throughout this application, the term extended realities (XR) is a catchall term to cover both augmented realities and mixed realities. In addition, head-wearable device is catchall term that covers extended-reality headsets such as augmented-reality headsets and mixed-reality headsets.

In one example AR or MR system, a user can perform a swiping in-air hand gesture to cause a song to be skipped by a song-providing API providing playback at, for example, a home speaker. As alluded to above a MR environment, as described herein, can include, but is not limited to, VR environments can, include non-immersive, semi-immersive, and fully immersive VR environments. As also alluded to above, AR environments can include marker-based augmented-reality environments, markerless augmented-reality environments, location-based augmented-reality environments, and projection-based augmented-reality environments. The above descriptions are not exhaustive and any other environment that allows for intentional environmental lighting to pass through to the user would fall within the scope of augmented-reality and any other environment that does not allow for intentional environmental lighting to pass through to the user would fall within the scope of a mixed-reality.

AR and MR content can include completely generated content or generated content combined with captured (e.g., real-world) content. The AR and MR content can include video, audio, haptic events, or some combination thereof, any of which can be presented in a single channel or in multiple channels (such as stereo video that produces a three-dimensional effect to a viewer). Additionally, AR and MR can also be associated with applications, products, accessories, services, or some combination thereof, which are used, for example, to create content in an AR or MR environment and/or are otherwise used in (e.g., to perform activities in) AR and MR environments.

A hand gesture, as described herein, can include an in-air gesture, a surface-contact gesture, and or other gestures that can be detected and determined based on movements of a single hand (e.g., a one-handed gesture performed with a user's hand that is detected by one or more sensors of a wearable device (e.g., electromyography (EMG) and/or inertial measurement units (IMU) s of a wrist-wearable device, and/or one or more sensors included in a smart textile wearable device) and/or detected via image data captured by an imaging device of a wearable device (e.g., a camera of a head-wearable device, an external tracking camera setup in the surrounding environment)) or a combination of the user's hands. In-air can mean that the user hand does not contact a surface, object, or portion of an electronic device (e.g., a head-wearable device or other communicatively coupled device, such as the wrist-wearable device), in other words the gesture is performed in open air in 3D space and without contacting a surface, an object, or an electronic device. Surface-contact gestures (contacts at a surface, object, body part of the user, or electronic device) more generally are also contemplated in which a contact (or an intention to contact) is detected at a surface (e.g., a single or double finger tap on a table, on a user's hand or another finger, on the user's leg, a couch, a steering wheel, etc.). The different hand gestures disclosed herein can be detected using image data and/or sensor data (e.g., neuromuscular signals sensed by one or more biopotential sensors (e.g., EMG sensors) or other types of data from other sensors, such as proximity sensors, time-of-flight (ToF) sensors, sensors of an inertial measurement unit (IMU), capacitive sensors, strain sensors, etc.) detected by a wearable device worn by the user and/or other electronic devices in the user's possession (e.g., smartphones, laptops, imaging devices, intermediary devices, and/or other devices described herein).

The devices include systems, wrist-wearable devices, headset devices, and smart textile-based garments. Specific operations described above may occur as a result of specific hardware. The devices described are not limiting and features on these devices can be removed or additional features can be added to these devices. The different devices can include one or more analogous hardware components. For brevity, analogous devices and components are described herein. Any differences in the devices and components are described below in their respective sections.

As described herein, a processor (e.g., a central processing unit (CPU) or microcontroller unit (MCU)), is an electronic component that is responsible for executing instructions and controlling the operation of an electronic device (e.g., a wrist-wearable device, a head-wearable device, an HIPD, a smart textile-based garment, or other computer system). There are several types of processors that may be used interchangeably or specifically required by embodiments described herein. For example, a processor may be (i) a general processor designed to perform a wide range of tasks, such as running software applications, managing operating systems, and performing arithmetic and logical operations; (ii) a microcontroller designed for specific tasks such as controlling electronic devices, sensors, and motors; (iii) a graphics processing unit (GPU) designed to accelerate the creation and rendering of images, videos, and animations (e.g., virtual-reality animations, such as three-dimensional modeling); (iv) a field-programmable gate array (FPGA) that can be programmed and reconfigured after manufacturing and/or customized to perform specific tasks, such as signal processing, cryptography, and machine learning; (v) a digital signal processor (DSP) designed to perform mathematical operations on signals such as audio, video, and radio waves. One of skill in the art will understand that one or more processors of one or more electronic devices may be used in various embodiments described herein.

As described herein, controllers are electronic components that manage and coordinate the operation of other components within an electronic device (e.g., controlling inputs, processing data, and/or generating outputs). Examples of controllers can include (i) microcontrollers, including small, low-power controllers that are commonly used in embedded systems and Internet of Things (IoT) devices; (ii) programmable logic controllers (PLCs) that may be configured to be used in industrial automation systems to control and monitor manufacturing processes; (iii) system-on-a-chip (SoC) controllers that integrate multiple components such as processors, memory, I/O interfaces, and other peripherals into a single chip; and/or DSPs. As described herein, a graphics module is a component or software module that is designed to handle graphical operations and/or processes, and can include a hardware module and/or a software module.

As described herein, memory refers to electronic components in a computer or electronic device that store data and instructions for the processor to access and manipulate. The devices described herein can include volatile and non-volatile memory. Examples of memory can include (i) random access memory (RAM), such as DRAM, SRAM, DDR RAM or other random access solid state memory devices, configured to store data and instructions temporarily; (ii) read-only memory (ROM) configured to store data and instructions permanently (e.g., one or more portions of system firmware and/or boot loaders); (iii) flash memory, magnetic disk storage devices, optical disk storage devices, other non-volatile solid state storage devices, which can be configured to store data in electronic devices (e.g., universal serial bus (USB) drives, memory cards, and/or solid-state drives (SSDs)); and (iv) cache memory configured to temporarily store frequently accessed data and instructions. Memory, as described herein, can include structured data (e.g., SQL databases, MongoDB databases, GraphQL data, or JSON data). Other examples of memory can include: (i) profile data, including user account data, user settings, and/or other user data stored by the user; (ii) sensor data detected and/or otherwise obtained by one or more sensors; (iii) media content data including stored image data, audio data, documents, and the like; (iv) application data, which can include data collected and/or otherwise obtained and stored during use of an application; and/or any other types of data described herein.

As described herein, a power system of an electronic device is configured to convert incoming electrical power into a form that can be used to operate the device. A power system can include various components, including (i) a power source, which can be an alternating current (AC) adapter or a direct current (DC) adapter power supply; (ii) a charger input that can be configured to use a wired and/or wireless connection (which may be part of a peripheral interface, such as a USB, micro-USB interface, near-field magnetic coupling, magnetic inductive and magnetic resonance charging, and/or radio frequency (RF) charging); (iii) a power-management integrated circuit, configured to distribute power to various components of the device and ensure that the device operates within safe limits (e.g., regulating voltage, controlling current flow, and/or managing heat dissipation); and/or (iv) a battery configured to store power to provide usable power to components of one or more electronic devices.

As described herein, peripheral interfaces are electronic components (e.g., of electronic devices) that allow electronic devices to communicate with other devices or peripherals and can provide a means for input and output of data and signals. Examples of peripheral interfaces can include (i) USB and/or micro-USB interfaces configured for connecting devices to an electronic device; (ii) Bluetooth interfaces configured to allow devices to communicate with each other, including Bluetooth low energy (BLE); (iii) near-field communication (NFC) interfaces configured to be short-range wireless interfaces for operations such as access control; (iv) POGO pins, which may be small, spring-loaded pins configured to provide a charging interface; (v) wireless charging interfaces; (vi) global-position system (GPS) interfaces; (vii) Wi-Fi interfaces for providing a connection between a device and a wireless network; and (viii) sensor interfaces.

As described herein, sensors are electronic components (e.g., in and/or otherwise in electronic communication with electronic devices, such as wearable devices) configured to detect physical and environmental changes and generate electrical signals. Examples of sensors can include (i) imaging sensors for collecting imaging data (e.g., including one or more cameras disposed on a respective electronic device, such as a SLAM camera(s)); (ii) biopotential-signal sensors; (iii) inertial measurement unit (e.g., IMUs) for detecting, for example, angular rate, force, magnetic field, and/or changes in acceleration; (iv) heart rate sensors for measuring a user's heart rate; (v) SpO2 sensors for measuring blood oxygen saturation and/or other biometric data of a user; (vi) capacitive sensors for detecting changes in potential at a portion of a user's body (e.g., a sensor-skin interface) and/or the proximity of other devices or objects; (vii) sensors for detecting some inputs (e.g., capacitive and force sensors), and (viii) light sensors (e.g., ToF sensors, infrared light sensors, or visible light sensors), and/or sensors for sensing data from the user or the user's environment. As described herein biopotential-signal-sensing components are devices used to measure electrical activity within the body (e.g., biopotential-signal sensors). Some types of biopotential-signal sensors include: (i) electroencephalography (EEG) sensors configured to measure electrical activity in the brain to diagnose neurological disorders; (ii) electrocardiography (ECG or EKG) sensors configured to measure electrical activity of the heart to diagnose heart problems; (iii) electromyography (EMG) sensors configured to measure the electrical activity of muscles and diagnose neuromuscular disorders; (iv) electrooculography (EOG) sensors configured to measure the electrical activity of eye muscles to detect eye movement and diagnose eye disorders.

As described herein, an application stored in memory of an electronic device (e.g., software) includes instructions stored in the memory. Examples of such applications include (i) games; (ii) word processors; (iii) messaging applications; (iv) media-streaming applications; (v) financial applications; (vi) calendars; (vii) clocks; (viii) web browsers; (ix) social media applications; (x) camera applications; (xi) web-based applications; (xii) health applications; (xiii) AR and MR applications, and/or any other applications that can be stored in memory. The applications can operate in conjunction with data and/or one or more components of a device or communicatively coupled devices to perform one or more operations and/or functions.

As described herein, communication interface modules can include hardware and/or software capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol, including communication protocols not yet developed as of the filing date of this document. A communication interface is a mechanism that enables different systems or devices to exchange information and data with each other, including hardware, software, or a combination of both hardware and software. For example, a communication interface can refer to a physical connector and/or port on a device that enables communication with other devices (e.g., USB, Ethernet, HDMI, or Bluetooth). A communication interface can refer to a software layer that enables different software programs to communicate with each other (e.g., application programming interfaces (APIs) and protocols such as HTTP and TCP/IP).

As described herein, a graphics module is a component or software module that is designed to handle graphical operations and/or processes, and can include a hardware module and/or a software module.

As described herein, non-transitory computer-readable storage media are physical devices or storage medium that can be used to store electronic data in a non-transitory form (e.g., such that the data is stored permanently until it is intentionally deleted or modified).

FIGS. 1A to 1D illustrates example AR content displayed within portions of an AR glasses device, in accordance with some embodiments. For ease of description, reference will be made to devices, components, and aspects described inf FIGS. 3A to 3C-1, but a skilled artisan will appreciate that the techniques described herein can be implemented with other devices and/or components other than those described herein.

FIG. 1A shows a user 302 of an AR device 328, including an illustration of the user's field of view 102 within a lens 104 of the AR glasses device 328. In accordance with some embodiments, a display safe space 106 is identified within the user's field of view, which may be predefined based on one or more factors discussed below. In accordance with some embodiments, imaging data is obtained about the physical surroundings of the user in conjunction with identifying the display safe space within the user's field of view.

Figure 1B:
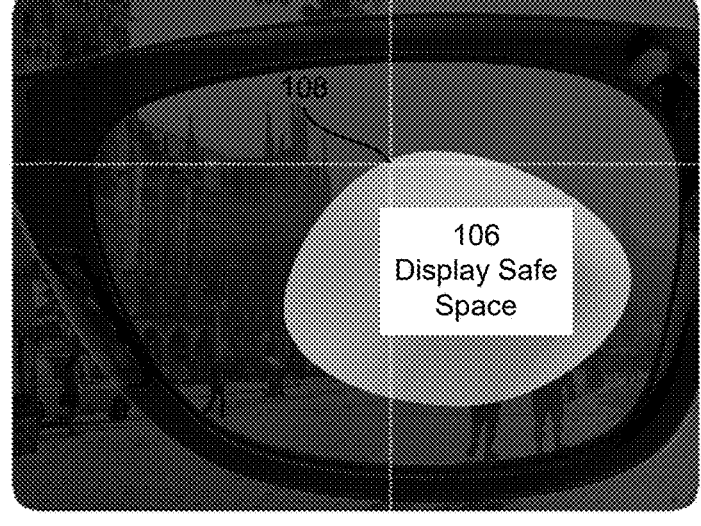

FIG. 1B includes another illustration of the user's field of view from FIG. 1A, that includes a gradient legend indicator more and less ideal portions of the user's field of view for presenting the AR content. In some embodiments, the quantifying of the idealness for locations of the AR content is based on one or more safety criteria, and/or one or more display location optimization criteria (e.g., display location factors). That is, there can be one or more display location factors (e.g., rationale) for optimizing a display location of AR content within the AR glasses device.

In some embodiments, the one or more display location factors include a display-line-of-sight factor relating to where, within the user's field of vision, the display will be caused to be displayed. In some embodiments, the display-light-of-sight factor is relative to the user's center gaze, which may be induced by rotation of the glasses relative to the user's eye (e.g., via a waveguide and display engine). Optimizing for such features can enable more efficient and/or comfortable viewing by the user while minimizing obfuscation of the user's physical surroundings (e.g., for social acceptability (e.g., based on the user's gaze angle) and/or health and safety reasons). In some embodiments, optimizing for such features minimize binocular rivalry by moving display of AR content towards the temple of the AR glasses device. In some embodiments, optimizing for such features minimizes eye strain by limiting an angular distance from the eye's resting gaze.

In some embodiments, the one or more display location factors include a fitment factor related to a range of facial geometries and variability among a population of potential users of the AR glasses device, to account for a variability of an observed angle in the user's field of vision where the display is caused to be presented. For example, users may have a particular ear-to-nose height and/or nose bridge fit affecting a respective vertical line-of-sight of the user. Users may have a particular eye (IPD) and head asymmetry affecting a horizontal line of sight of the respective user. Users may also have particular wear variabilities, which may affect vertical and/or horizontal line of sights of the users. In some embodiments, the fitment factor causes dynamic adjustment of the safe display space as the user 302 adjusts between a gaze angle of between −8.7 degrees (e.g., angled slightly upward) and 9.5 degrees (e.g., angled slightly downward).

In some embodiments, the one or more display location factors include a binocular rivalry factor configured to minimize conflict in the user's vision system between their left and right eyes. As described herein binocular rivalry includes the causing of a sensation of the display fading in and out since the two views cannot be easily fused by the human vision system. In some embodiments, such binocular rivalry is more likely to occur (and therefore the factor may be weighted accordingly) when there is a binocular overlap region of the user's field of view (e.g., the user's central vision). In some embodiments, the optimized display location minimizes rivalry to increase viewing comfort by shifting display more towards the temple of the AR glasses device.

In some embodiments, the one or more display location factors include a focal length factor related to a virtual image distance (VID) of the display, which may be set by the lenses in the eyepiece assembly.

In some embodiments, the one or more display location factors include an eyebox position factor based on the physical volume in which the user of the AR glasses device can view the display. In some embodiments, when the AR content would be caused to be presented outside of the eyebox position, clipping is caused to occur to clip the viewable portion of the AR content. In some embodiments, the optimized display location is configured to enable a largest population of the total population of AR glasses device users to view the full display of AR content through the eyebox by delivering the correct fitment to the broadest population.

Figure 1C:
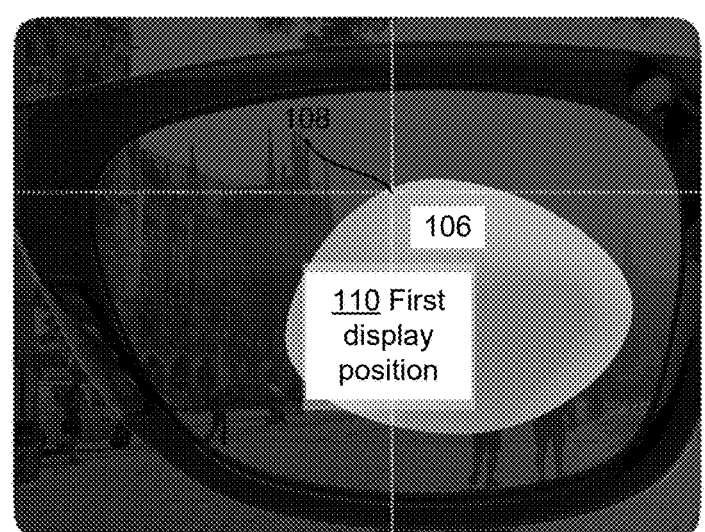
Figure 1C:
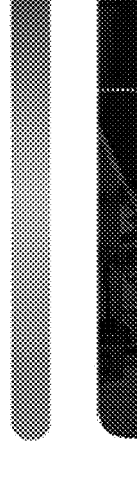
Figure 1D:
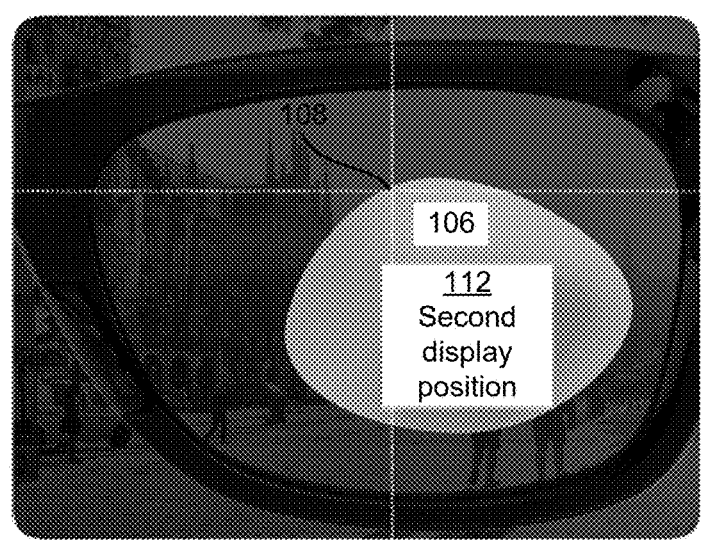

FIG. 1C includes another illustration of the user's field of view from FIGS. 1A and 1B, further including a first optimized display location 110 for AR content to be displayed, in accordance with some embodiments. As illustrated in FIGS. 1B to 1D, the optimized display location can be defined by a defined center location 108 (which may correspond to a center of a virtual eyebox, and/or an actual eyebox of the user determined while they are wearing the AR device 328). In some embodiments, the center location 108 is the center of a virtual eyebox as determined based on a distribution of eyebox locations of different users wearing the AR headset. In some embodiments, the optimized display location is located below the center location 108 corresponding to the center of the virtual eyebox. In some embodiments, the first optimized display location is centered on a plane defining a horizontal component of the center location.

FIG. 1D includes another illustration of the user's field of view from FIG. 1A to 1C, further including a second optimized display location 112 for AR content to be displayed, in accordance with some embodiments. In some embodiments, the optimized display location is located in a lower right quadrant with respect to the center location 108 (e.g., having a negative vertical offset (e.g., −15 degrees), and a positive horizontal offset (e.g., +6 degrees).

FIGS. 2A to 2D illustrate example aspects of determining an optimized display location for AR content within a lens of an AR glasses device, in accordance with some embodiments. In some embodiments, a pantoscopic tilt factor is applied to the eyebox center position, which may be based on a common distribution of pantoscopic tilt experienced by AR devices worn by users across a population. As described herein, pantoscopic tilt is a measurement that analyzes the angle from the bottom of the user's glasses (at the cheek) to the top of the frame. In some embodiments, a default pantoscopic tilt of 7 degrees is applied to the AR content.

Figure 2A:
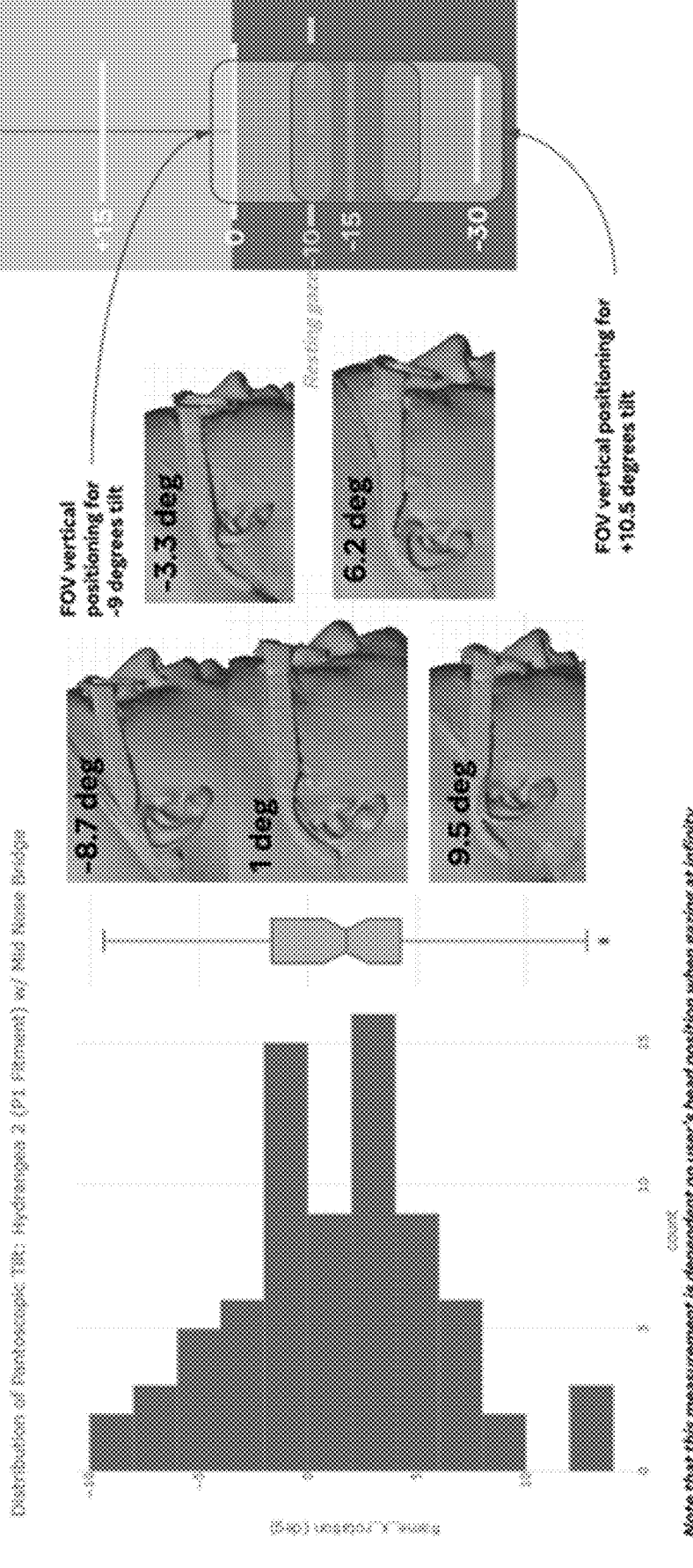
FIGS. 2A to 2D illustrate example aspects of determining an optimized display location for AR content within a lens of an AR glasses device, in accordance with some embodiments.

FIG. 2A shows an illustration of a first range of projection angles of the optimized display location based on a gaze angle of the user. In some embodiments, the optimized display location can be adjusted based on an angular tilt of a user's head. For example, as the field of view is adjusted based on an angular tilt of the user's head, an optimized display location of the content can be adjusted to the provide the user with a more intuitive experience, by adjusting the respective offsets of the optimized display locations according to the tilt of the user's head.

Users' head shape variability drives how the glasses sit on users' face, and thus the nominal design position is chosen to be at the center of these distributions (7° pantoscopic tilt and 0° horizontal tilt). Due to this variability in head shape, around 70% of users will be within ±5° from the targeted −15° vertical display offset. The most extreme (~5th percentile) users will be ±10° from the target, and will have the top of the display extending 2° above the horizon. However, this still allows the majority of the display to be rendered below the horizon for all users.

Figure 2B:
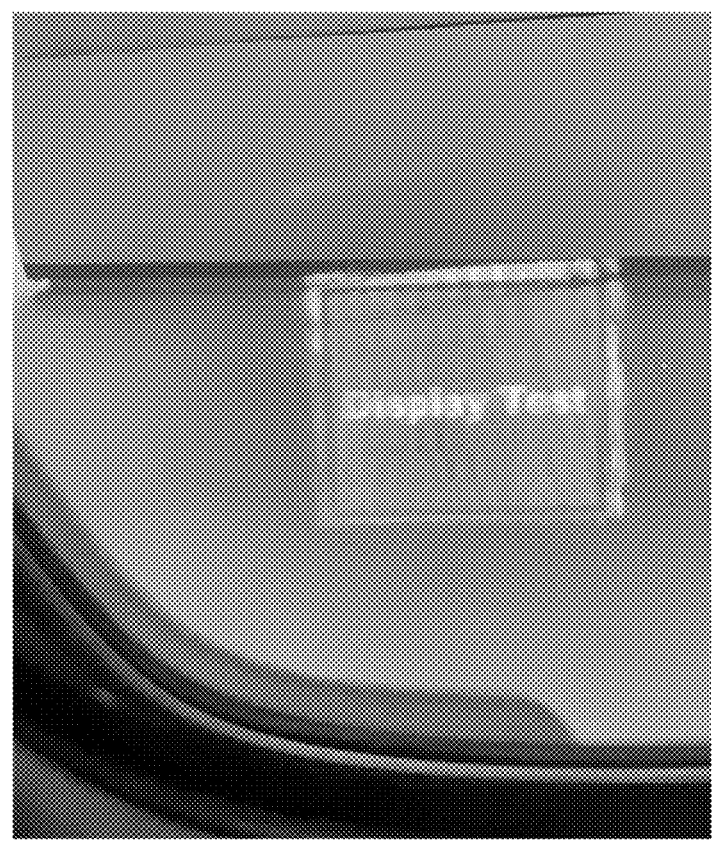

FIG. 2B shows a first example of AR content being presented at a first optimized display location of the AR device 128 based on a first gaze angle of the user.

Figure 2C:
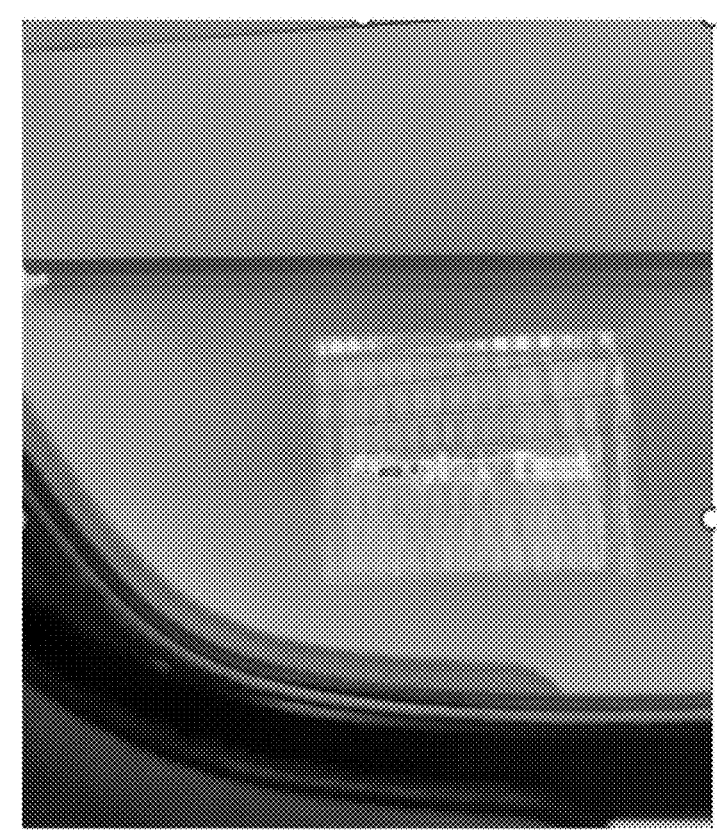

FIG. 2C shows a second example of AR content being presented at a second optimized display location of the AR device 128 based on a second gaze angle of the user, distinct from the first gaze angle of the user in FIG. 2B. That is, based on the user adjusting their gaze angle, the AR device may adjust the location within the lens where the AR content is presented based on a modification to the center location 108 of the eyebox of the user based on the adjusted gaze angle. In some embodiments, a temporal offset is applied to the adjustment of the optimized display location (e.g., a delay in the spatial adjustment of the content), which can be used to improve content clarity (e.g., independent of eye dominance), and may also help to alleviate concern that the wearer is stating at the body of their conversation partner (e.g., furthering the goal of social acceptability).

Figure 2D:

FIG. 2D shows AR content being presented with a particular VID, based on real-world objects in the user's physical surroundings, in accordance with some embodiments. In some embodiments, the VID of the AR content is based on a focal plane of the AR device 228. As described herein, a focal plane is a plane is a point in physical space where the focuses of a particular lens are likely to lie in (e.g., where light rays emitted from the lens are likely to converge). In some embodiments, the VID-determined focal plane is determined such that users having presbyopia are less likely to be adversely impacted by display of AR content (e.g., having a far enough focal plane to avoid adverse impacts). In some embodiments, the focal plane is configured to be greater than 0.6 meters (e.g., 1 meter, 1.25 meters, etc.). In some embodiments, the respective focal plane of the AR content can be adjusted between a particular range (e.g., 0.6 to 1.25 meters, 1 to 2 meters). In some embodiments, the AR device 228 is configured such that the focal plane does not extend beyond 2 meters.

Example Extended Reality Systems

Figure 3A:
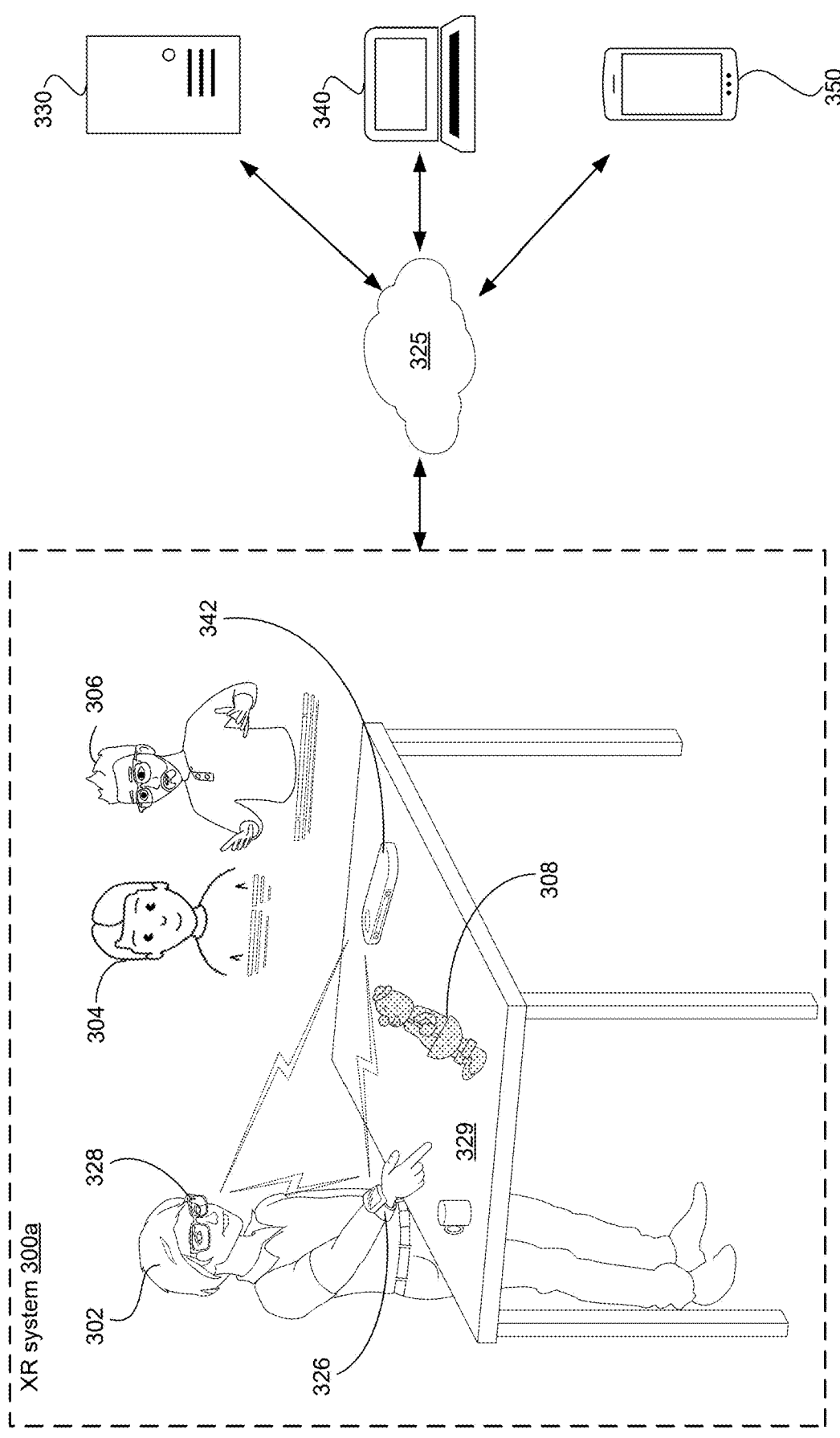
FIGS. 3A, 3B, and 3C-1, and 3C-2 illustrate example MR and AR systems, in accordance with some embodiments.
Figure 3B:
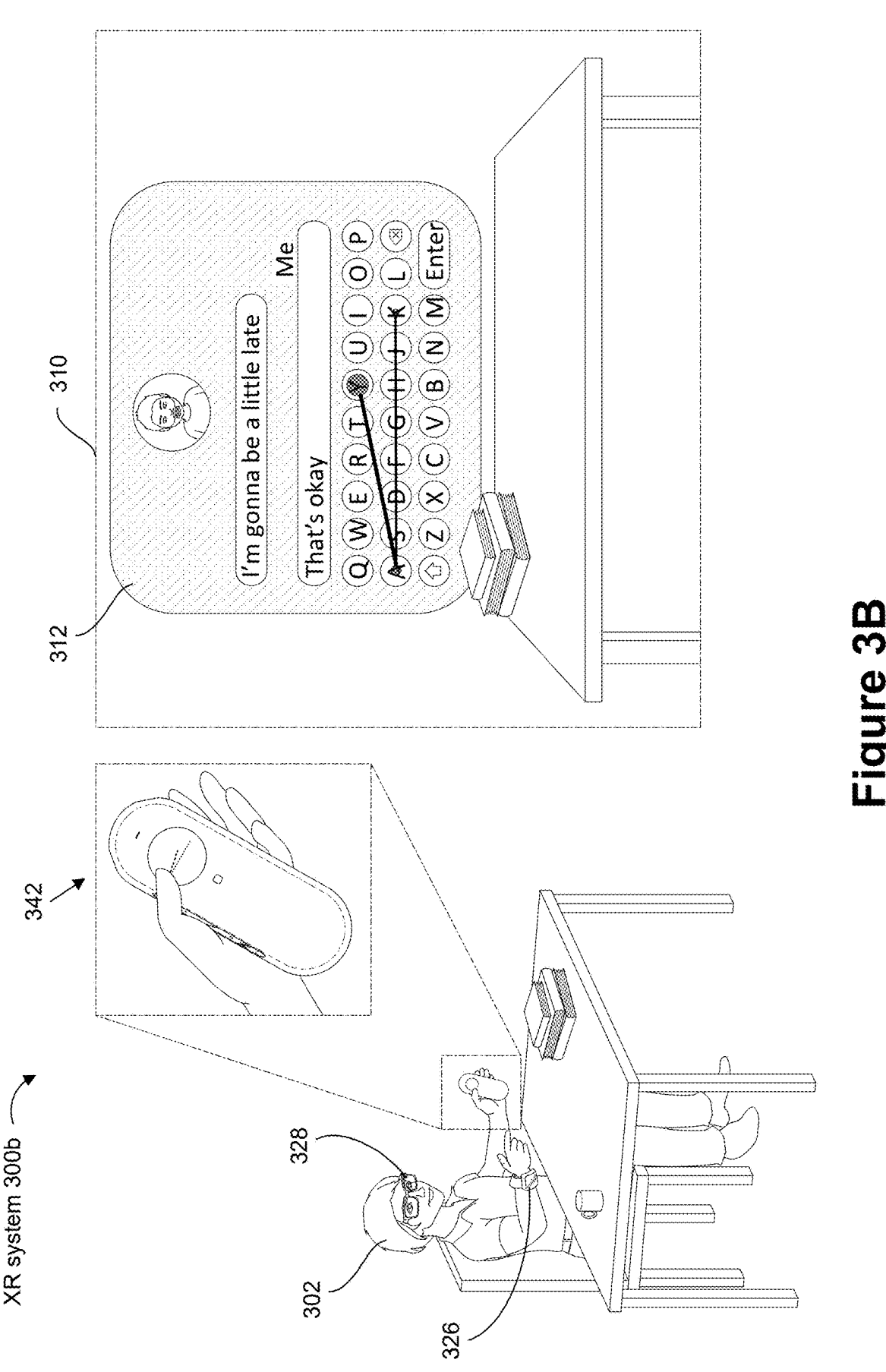
Figures 1, 3C:
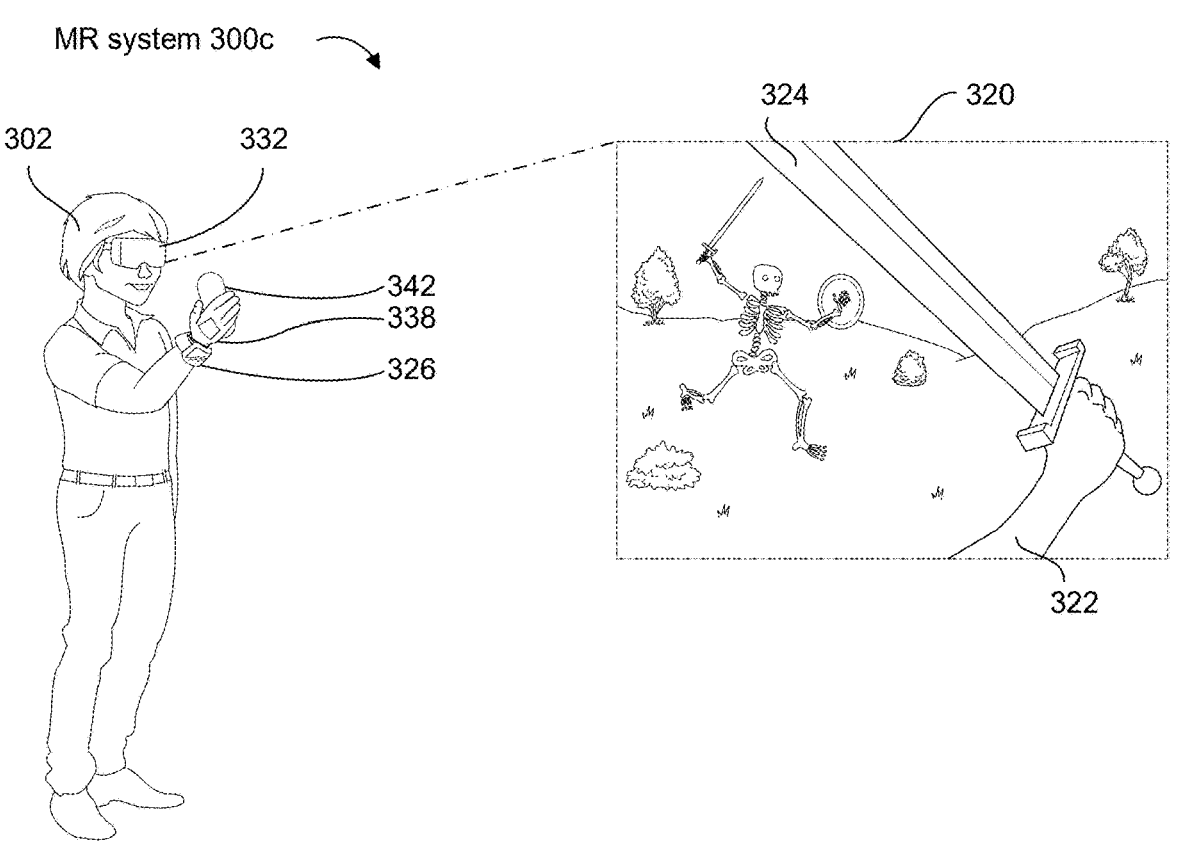
Figures 2, 3C:
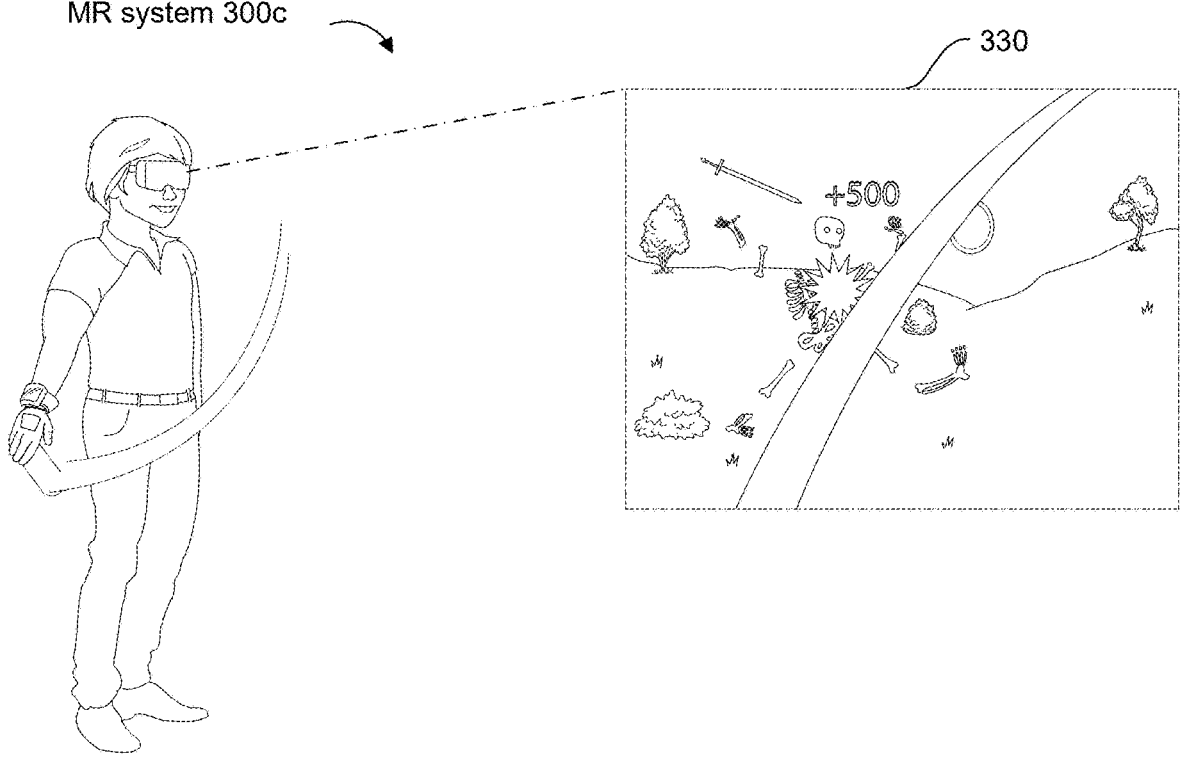

FIGS. 3A 3B, 3C-1, and 3C-2, illustrate example XR systems that include AR and MR systems, in accordance with some embodiments. FIG. 3A shows a first XR system 300a and a first example user interactions using a wrist-wearable device 326, a head-wearable device (e.g., AR device 328, which may be described as an AR glasses device herein), and/or a handheld intermediary processing device (HIPD) 330. FIG. 3B shows a second XR system 300b and second example user interactions using a wrist-wearable device 326, AR device 328, and/or an HIPD 342. FIGS. 3C-1 and 3C-2 show a third MR system 300c and third example user interactions using a wrist-wearable device 326, a head-wearable device (e.g., a mixed-reality device such as a virtual-reality (VR) device), and/or an HIPD 342. As the skilled artisan will appreciate upon reading the descriptions provided herein, the above-example AR and MR systems (described in detail below) can perform various functions and/or operations.

The wrist-wearable device 326, the head-wearable devices, and/or the HIPD 342 can communicatively couple via a network 325 (e.g., cellular, near field, Wi-Fi, personal area network, wireless LAN, etc.). Additionally, the wrist-wearable device 326, the head-wearable devices, and/or the HIPD 342 can also communicatively couple with one or more servers 330, computers 340 (e.g., laptops, computers, etc.), mobile devices 350 (e.g., smartphones, tablets, etc.), and/or other electronic devices via the network 325 (e.g., cellular, near field, Wi-Fi, personal area network, wireless LAN, etc.). Similarly, a smart textile-based garment, when used, can also communicatively couple with the wrist-wearable device 326, the head-wearable device(s), the HIPD 342, the one or more servers 330, the computers 340, the mobile devices 350, and/or other electronic devices via the network 325 to provide inputs.

Turning to FIG. 3A, a user 302 is shown wearing the wrist-wearable device 326 and the AR device 328, and having the HIPD 342 on the physical desk within the user's physical surroundings. The wrist-wearable device 326, the AR device 328, and the HIPD 342 facilitate user interaction with an AR environment. In particular, as shown by the first AR system 300a, the wrist-wearable device 326, the AR device 328, and/or the HIPD 342 cause presentation of one or more avatars (e.g., an avatar 304), digital representations of contacts (e.g., a digital representation 306), and/or virtual objects (e.g., a virtual object 308 presented slightly above the surface of the physical table). As discussed below, the user 302 can interact with the one or more avatars 304, digital representations of the contacts 306, and virtual objects 308 via the wrist-wearable device 326, the AR device 328, and/or the HIPD 342. In addition, the user 302 is also able to directly view physical objects in the environment, such as a physical table 329, through transparent lens(es) and waveguide(s) of the AR device 328. Alternatively, a MR device could be used in place of the AR device 328 and a similar user experience can take place, but the user would not be directly viewing physical objects in the environment, such as table 329, and would instead be presented with a virtual reconstruction of the table 329 produced from one or more sensors of the MR device (e.g., an outward facing camera capable of recording the surrounding environment).

The user 302 can use any one or more of the computing devices described herein, such as the wrist-wearable device 326, the AR device 328 (e.g., through physical inputs at the AR device and/or built in motion tracking of a user's extremities), a smart-textile garment, externally mounted extremity tracking device, the HIPD 342 to provide user inputs, etc. For example, the user 302 can perform one or more hand gestures that are detected by the wrist-wearable device 326 (e.g., using one or more EMG sensors and/or IMUs built into the wrist-wearable device) and/or the AR device 328 (e.g., using one or more image sensors or cameras) to provide a user input. Alternatively, or additionally, the user 302 can provide a user input via one or more touch surfaces of the wrist-wearable device 326, the AR device 328, and/or the HIPD 342, and/or voice commands captured by a microphone of the wrist-wearable device 326, the AR device 328, and/or the HIPD 342. The wrist-wearable device 326, the AR device 328, and/or the HIPD 342 can include an artificially intelligent (AI) digital assistant to help the user in providing a user input (e.g., completing a sequence of operations, suggesting different operations or commands, providing reminders, confirming a command). For example, the digital assistant can be invoked through an input occurring at the AR device 328 (e.g., via an input at a temple arm of the AR device 328). In some embodiments, the user 302 can provide a user input via one or more facial gestures and/or facial expressions. For example, cameras of the wrist-wearable device 326, the AR device 328, and/or the HIPD 342 can track the user 302's eyes for navigating a user interface.

The wrist-wearable device 326, the AR device 328, and/or the HIPD 342 can operate alone or in conjunction with each other to allow the user 302 to interact with the AR environment. In some embodiments, the HIPD 342 is configured to operate as a central hub or control center for the wrist-wearable device 326, the AR device 328, and/or another communicatively coupled device. For example, the user 302 can provide an input to interact with the AR environment at any of the wrist-wearable device 326, the AR device 328, and/or the HIPD 342. In some embodiments, the HIPD 342 can identify one or more back-end and front-end tasks to cause the performance of the requested interaction and distribute instructions to cause the performance of the one or more back-end and front-end tasks at the wrist-wearable device 326, the AR device 328, and/or the HIPD 342. In some embodiments, a back-end task is a background-processing task that is not perceptible by the user (e.g., rendering content, decompression, compression, etc.), and a front-end task is a user-facing task that is perceptible to the user (e.g., presenting information to the user, providing feedback to the user, etc.)). The HIPD 342 can perform the back-end tasks and provide the wrist-wearable device 326 and/or the AR device 328 operational data corresponding to the performed back-end tasks such that the wrist-wearable device 326 and/or the AR device 328 can perform the front-end tasks. In this way, the HIPD 342, which has more computational resources and greater thermal headroom than the wrist-wearable device 326 and/or the AR device 328, performs computationally intensive tasks and reduces the computer resource utilization and/or power usage of the wrist-wearable device 326 and/or the AR device 328.

In the example shown by the first AR system 200a, the HIPD 342 identifies one or more back-end tasks and front-end tasks associated with a user request to initiate an AR video call with one or more other users (represented by the avatar 304 and the digital representation of the contact 306) and distributes instructions to cause the performance of the one or more back-end tasks and front-end tasks. In particular, the HIPD 342 performs back-end tasks for processing and/or rendering image data (and other data) associated with the AR video call and provides operational data associated with the performed back-end tasks to the AR device 328 such that the AR device 328 performs front-end tasks for presenting the AR video call (e.g., presenting the avatar 304 and the digital representation of the contact 306).

In some embodiments, the HIPD 342 can operate as a focal or anchor point for causing the presentation of information. This allows the user 302 to be generally aware of where information is presented. For example, as shown in the first AR system 200a, the avatar 304 and the digital representation of the contact 306 are presented above the HIPD 342. In particular, the HIPD 342 and the AR device 328 operate in conjunction to determine a location for presenting the avatar 304 and the digital representation of the contact 306. In some embodiments, information can be presented within a predetermined distance from the HIPD 342 (e.g., within five meters). For example, as shown in the first AR system 200a, virtual object 208 is presented on the desk some distance from the HIPD 230. Similar to the above example, the HIPD 230 and the AR device 328 can operate in conjunction to determine a location for presenting the virtual object 108. Alternatively, in some embodiments, presentation of information is not bound by the HIPD 230. More specifically, the avatar 304, the digital representation of the contact 306, and the virtual object 208 do not have to be presented within a predetermined distance of the HIPD 342. Although an AR device 328 is described working with an HIPD, a MR headset can be interacted with in the same way as the AR device 328 (e.g., with respect to the HIPD 342).

User inputs provided at the wrist-wearable device 326, the AR device 328, and/or the HIPD 342 are coordinated such that the user can use any device to initiate, continue, and/or complete an operation. For example, the user 302 can provide a user input to the AR device 328 to cause the AR device 328 to present the virtual object 208 and, while the virtual object 208 is presented by the AR device 328, the user 302 can provide one or more hand gestures via the wrist-wearable device 326 to interact and/or manipulate the virtual object 208. While an AR device 328 is described working with a wrist-wearable device 326, a MR headset can be interacted with in the same way as the AR device 328.

FIG. 3A illustrates an interaction in which an artificially intelligent (AI) virtual assistant can assist in requests made by a user 302. The AI virtual assistant can be used to complete open-ended requests made through natural language inputs by a user 302. For example, FIG. 3A the user 302 makes an audible request 344 to summarize the conversation and then share the summarized conversation with others in the meeting. In addition, the AI virtual assistant is configured to use sensors of the extended-reality system (e.g., cameras of an extended-reality headset, microphones, and various other sensors of any of the devices in the system) to provide contextual prompts to the user for initiating tasks. For example, a user may FIG. 3A also illustrates an example neural network 252 that is used to train an Artificial Intelligence. Uses of Artificial Intelligences are varied and encompass many distinct aspects of the devices and systems described herein. AI capabilities cover a diverse range of applications and deepen interactions between the user 302 and user devices (e.g., the AR device 328, a MR device 332, the HIPD 342, the wrist-wearable device 326, etc.). The AI discussed herein can be derived using many different training models, including but not limited to artificial neural networks (ANNs), deep neural networks (DNN), convolution neural networks (CNN), recurrent neural network (RNN), large language model (LLM), long short-term memory networks, transformer models, decision trees, random forests, support vector machines, k-nearest neighbors, genetic algorithms, Markov models, Bayesian networks, fuzzy logic systems, and deep reinforcement learnings, etc. For devices and systems herein that employ multiple AIs, depending on the task different models can be used. For example, for a natural language AI virtual assistant a LLM can be used and for object detection of a physical environment a DNN can be used instead.

In another example, an AI virtual assistant can include many different AI models and based on the user's request multiple AI models may be employed (concurrently, sequentially or a combination thereof). For example, an LLM based AI can provide instructions for helping a user follow a recipe and the instructions can be based in part on another AI that is derived from an ANN, a DNN, a RNN, etc. that is capable of discerning what part of the recipe the user is on (e.g., object and scene detection).

As AI training models evolve, the operations and experiences described herein could potentially be performed with different models other than those listed above, and a person skilled in the art would understand that the list above is non-limiting.

A user 302 can interact with AI through natural language inputs captured by a voice sensor, text inputs, or any other input modality that accepts natural language and/or a corresponding voice sensor module. In another instance, a user can provide an input by tracking an eye gaze of a user 302 via a gaze tracker module. Additionally, the AI can also receive inputs beyond those supplied by a user 302. For example, the AI can generate its response further based on environmental inputs (e.g., temperature data, image data, video data, ambient light data, audio data, GPS location data, inertial measurement (i.e., user motion) data, pattern recognition data, magnetometer data, depth data, pressure data, force data, neuromuscular data, heart rate data, temperature data, sleep data, etc.) captured in response to a user request by various types of sensors and/or their corresponding sensor modules. The sensors data can be retrieved entirely from a single device (e.g., AR device 328) or from multiple devices that are in communication with each other (e.g., a system that includes at least two of: an AR device 328, a MR device 332, the HIPD 342, the wrist-wearable device 326, etc.). The AI can also access additional information (e.g., one or more servers 230, the computers 240, the mobile devices 250, and/or other electronic devices) via a network 325.

A non-limiting list of AI enhanced functions includes but is not limited to image recognition, speech recognition (e.g., automatic speech recognition), text recognition (e.g., scene text recognition), pattern recognition, natural language processing and understanding, classification, regression, clustering, anomaly detection, sequence generation, content generation, and optimization. In some embodiments, AI enhanced functions are fully or partially executed on cloud computing platforms communicatively coupled to the user devices (e.g., the AR device 328, a MR device 332, the HIPD 342, the wrist-wearable device 326, etc.) via the one or more networks. The cloud computing platforms provide scalable computing resources, distributed computing, managed AI services, interference acceleration, pre-trained models, application programming interface (APIs), and/or other resources to support comprehensive computations required by the AI enhanced function.

Example outputs stemming from the use of AI can include natural language responses, mathematical calculations, charts displaying information, audio, images, videos, texts, summaries of meetings, predictive operations based on environmental factors, classifications, pattern recognitions, recommendations, assessments, or other operations. In some embodiments, the generated outputs are stored on local memories of the user devices (e.g., the AR device 328, a MR device 332, the HIPD 342, the wrist-wearable device 326, etc.), storages of the external devices (servers, computers, mobile devices, etc.), and/or storages of the cloud computing platforms.

The AI based outputs can be presented across different modalities (e.g., audio-based, visual-based, haptic-based, and any combination thereof) and across different devices of the XR system described herein. Some visual based outputs can include the displaying of information on XR augments of a XR headset, user interfaces displayed at a wrist-wearable device, laptop device, mobile device, etc. On devices with or without displays (e.g., HIPD 342), haptic feedback can provide information to the user 302. An artificial intelligence can also use the inputs described above to determine the appropriate modality and device(s) to present content to the user (e.g., a user walking on a busy road can be presented with an audio output instead of a visual output to avoid distracting the user 302).

Example Augmented-Reality Interaction

FIG. 3B shows the user 302 wearing the wrist-wearable device 326 and the AR device 328, and holding the HIPD 342. In the second AR system 300b, the wrist-wearable device 326, the AR device 328, and/or the HIPD 342 are used to receive and/or provide one or more messages to a contact of the user 302. In particular, the wrist-wearable device 326, the AR device 328, and/or the HIPD 342 detect and coordinate one or more user inputs to initiate a messaging application and prepare a response to a received message via the messaging application.

In some embodiments, the user 302 initiates, via a user input, an application on the wrist-wearable device 326, the AR device 328, and/or the HIPD 342 that causes the application to initiate on at least one device. For example, in the second AR system 200b, the user 302 performs a hand gesture associated with a command for initiating a messaging application (represented by messaging user interface 312); the wrist-wearable device 326 detects the hand gesture; and, based on a determination that the user 302 is wearing AR device 328, causes the AR device 328 to present a messaging user interface 312 of the messaging application. The AR device 328 can present the messaging user interface 312 to the user 302 via its display (e.g., as shown by user 302's field of view 310). In some embodiments, the application is initiated and can be run on the device (e.g., the wrist-wearable device 326, the AR device 328, and/or the HIPD 342) that detects the user input to initiate the application, and the device provides another device operational data to cause the presentation of the messaging application. For example, the wrist-wearable device 326 can detect the user input to initiate a messaging application, initiate and run the messaging application, and provide operational data to the AR device 328 and/or the HIPD 342 to cause presentation of the messaging application. Alternatively, the application can be initiated and run at a device other than the device that detected the user input. For example, the wrist-wearable device 326 can detect the hand gesture associated with initiating the messaging application and cause the HIPD 342 to run the messaging application and coordinate the presentation of the messaging application.

Further, the user 302 can provide a user input at the wrist-wearable device 326, the AR device 328, and/or the HIPD 230 to continue and/or complete an operation initiated at another device. For example, after initiating the messaging application via the wrist-wearable device 326 and while the AR device 328 presents the messaging user interface 212, the user 302 can provide an input at the HIPD 342 to prepare a response (e.g., shown by the swipe gesture performed on the HIPD 342). The user 302's gestures performed on the HIPD 342 can be provided and/or displayed on another device. For example, the user 302's swipe gestures performed on the HIPD 342 are displayed on a virtual keyboard of the messaging user interface 312 displayed by the AR device 328.

In some embodiments, the wrist-wearable device 326, the AR device 328, the HIPD 342, and/or other communicatively coupled devices can present one or more notifications to the user 302 (e.g., concurrently, or in a coordinated fashion based on an interaction context of the user). The notification can be an indication of a new message, an incoming call, an application update, a status update, etc. The user 302 can select the notification via the wrist-wearable device 326, the AR device 328, or the HIPD 342 and cause presentation of an application or operation associated with the notification on at least one device. For example, the user 302 can receive a notification that a message was received at the wrist-wearable device 326, the AR device 328, the HIPD 342, and/or other communicatively coupled device and provide a user input at the wrist-wearable device 326, the AR device 328, and/or the HIPD 342 to review the notification, and the device detecting the user input can cause an application associated with the notification to be initiated and/or presented at the wrist-wearable device 326, the AR device 328, and/or the HIPD 342.

While the above example describes coordinated inputs used to interact with a messaging application, the skilled artisan will appreciate upon reading the descriptions that user inputs can be coordinated to interact with any number of applications including, but not limited to, gaming applications, social media applications, camera applications, web-based applications, financial applications, etc. For example, the AR device 328 can present to the user 302 game application data and the HIPD 342 can use a controller to provide inputs to the game. Similarly, the user 302 can use the wrist-wearable device 326 to initiate a camera of the AR device 328, and the user can use the wrist-wearable device 326, the AR device 328, and/or the HIPD 342 to manipulate the image capture (e.g., zoom in or out, apply filters, etc.) and capture image data.

While an AR device 328 is shown being capable of certain functions, it is understood that an AR device can be an AR device with varying functionalities based on costs and market demands. For example, an AR device may include a single output modality such as an audio output modality. In another example, the AR device may include a low-fidelity display as one of the output modalities, where simple information (e.g., text and/or low-fidelity images/video) is capable of being presented to the user. In yet another example, the AR device can be configured with front-facing LED(s) configured to provide a user with information, e.g., a LED around the right-side lens can illuminate to notify the wearer to turn right while directions are being provided or a LED on the left-side can illuminate to notify the wearer to turn left while directions are being provided. In another embodiment, the AR device can include an outward facing projector such that information (e.g., text information, media, etc.) may be displayed on the palm of a user's hand or other suitable surface (e.g., a table, whiteboard, etc.). In yet another embodiment, information may also be provided by locally dimming portions of a lens to emphasize portions of the environment in which the user's attention should be directed. These examples are non-exhaustive and features of one AR device described above can combined with features of another AR device described above. While features and experiences of an AR device have been described generally in the preceding sections, it is understood that the described functionalities and experiences can be applied in an analogous manner to a MR headset, which is described below in the proceeding sections.

Example Mixed-Reality Interaction

Turning to FIGS. 3C-1 and 3C-2, the user 302 is shown wearing the wrist-wearable device 326 and a MR device 332 (e.g., a device capable of providing either an entirely virtual reality (VR) experience or a mixed reality experience that displays object(s) from a physical environment at a display of the device), and holding the HIPD 342. In the third AR system 300c, the wrist-wearable device 326, the MR device 332, and/or the HIPD 342 are used to interact within an MR environment, such as a VR game or other MR/VR application. While the MR device 332 present a representation of a VR game (e.g., first MR game environment 320) to the user 302, the wrist-wearable device 326, the MR device 332, and/or the HIPD 342 detect and coordinate one or more user inputs to allow the user 302 to interact with the VR game.

In some embodiments, the user 302 can provide a user input via the wrist-wearable device 326, the MR device 332, and/or the HIPD 342 that causes an action in a corresponding MR environment. For example, the user 302 in the third MR system 300c (shown in FIG. 3C-1) raises the HIPD 342 to prepare for a swing in the first MR game environment 320. The MR device 332, responsive to the user 302 raising the HIPD 342, causes the MR representation of the user 302 to perform a similar action (e.g., raise a virtual object, such as a virtual sword 324). In some embodiments, each device uses respective sensor data and/or image data to detect the user input and provide an accurate representation of the user 302's motion. For example, image sensors (e.g., SLAM cameras or other cameras) of the HIPD 342 can be used to detect a position of the HIPD 342 relative to the user 302's body such that the virtual object can be positioned appropriately within the first MR game environment 320; sensor data from the wrist-wearable device 326 can be used to detect a velocity at which the user 302 raises the HIPD 342 such that the MR representation of the user 302 and the virtual sword 324 are synchronized with the user 302's movements; and image sensors of the MR device 332 can be used to represent the user 302's body, boundary conditions, or real-world objects within the first MR game environment 320.

In FIG. 3C-2, the user 302 performs a downward swing while holding the HIPD 342. The downward swing of the user 302 is detected by the wrist-wearable device 326, the MR device 332, and/or the HIPD 342 and a corresponding action is performed in the first MR game environment 320. In some embodiments, the data captured by each device is used to improve the user's experience within the MR environment. For example, sensor data of the wrist-wearable device 326 can be used to determine a speed and/or force at which the downward swing is performed and image sensors of the HIPD 342 and/or the MR device 332 can be used to determine a location of the swing and how it should be represented in the first MR game environment 320, which, in turn, can be used as inputs for the MR environment (e.g., game mechanics, which can use detected speed, force, locations, and/or aspects of the user 302's actions to classify a user's inputs (e.g., user performs a light strike, hard strike, critical strike, glancing strike, miss) or calculate an output (e.g., amount of damage)).

While the wrist-wearable device 326, the MR device 332, and/or the HIPD 342 are described as detecting user inputs, in some embodiments, user inputs are detected at a single device (with the single device being responsible for distributing signals to the other devices for performing the user input). For example, the HIPD 342 can operate an application for generating the first MR game environment 320 and provide the MR device 332 with corresponding data for causing the presentation of the first MR game environment 320, as well as detect the 202's movements (while holding the HIPD 342) to cause the performance of corresponding actions within the first MR game environment 320. Additionally, or alternatively, in some embodiments, operational data (e.g., sensor data, image data, application data, device data, and/or other data) of one or more devices is provide to a single device (e.g., the HIPD 342) to process the operational data and cause respective devices to perform an action associated with processed operational data.

In some embodiments, the user 302 can wear a wrist-wearable device 326, wear a MR device 332, wear a smart textile-based garments 238 (e.g., wearable haptic gloves), and/or hold an HIPD 342 device. In this embodiment, the wrist-wearable device 326, the MR device 332, and/or the smart textile-based garments 338 are used to interact within an MR environment (e.g., any AR or MR system described above in reference to FIGS. 3A-3B). While the MR device 332 presents a representation of a MR game (e.g., second MR game environment 330) to the user 302, the wrist-wearable device 326, the MR device 332, and/or the smart textile-based garments 338 detect and coordinate one or more user inputs to allow the user 302 to interact with the MR environment.

In some embodiments, the user 302 can provide a user input via the wrist-wearable device 326, a HIPD 342, the MR device 332, and/or the smart textile-based garments 238 that causes an action in a corresponding MR environment. For example, the user 302. In some embodiments, each device uses respective sensor data and/or image data to detect the user input and provide an accurate representation of the user 302's motion. While four different input devices are shown (i.e., a wrist-wearable device 326, a MR device 332, a HIPD 342, and a smart textile-based garment 338)

each one of these input devices entirely on their own can provide inputs for fully interacting with the MR environment. For example, the wrist-wearable device can provide sufficient inputs on its own for interacting with the MR environment. In some embodiments, if multiple input devices are used (e.g., a wrist-wearable device and the smart textile-based garment 338) sensor fusion can be utilized to ensure inputs are correct. While multiple input devices are described, it is understood other input devices can be used in conjunction or on their own instead, such as but not limited to: external motion tracking cameras, other wearable devices fitted to different parts of a user, apparatuses that allow for a user to experience walking in a MR while remaining substantially stationary in the physical environment, etc.

As described above, the data captured by each device is used to improve the user's experience within the MR environment. Although not shown, the smart textile-based garments 138 can be used in conjunction with an MR device and/or an HIPD 342.

While some experiences are described as occurring on an AR device and other experiences described as occurring on a MR device, one skilled in the art would appreciate that experiences can be ported over from a MR device to an AR device, and vice versa.

Some definitions of devices and components that can be included in some or all of the example devices discussed are defined here for ease of reference. A skilled artisan will appreciate that certain types of the components described may be more suitable for a particular set of devices, and less suitable for another set of devices. But subsequent reference to the components defined here should be considered to be encompassed by the definitions provided.

In some embodiments example devices and systems, including electronic devices and systems, will be discussed. Such example devices and systems are not intended to be limiting, and one of skill in the art will understand that alternative devices and systems to the example devices and systems described herein may be used to perform the operations and construct the systems and device that are described herein.

As described herein, an electronic device is a device that uses electrical energy to perform a specific function. It can be any physical object that contains electronic components such as transistors, resistors, capacitors, diodes, and integrated circuits. Examples of electronic devices include smartphones, laptops, digital cameras, televisions, gaming consoles, and music players, as well as the example electronic devices discussed herein. As described herein, an intermediary electronic device is a device that sits between two other electronic devices, and/or a subset of components of one or more electronic devices and facilitates communication, and/or data processing and/or data transfer between the respective electronic devices and/or electronic components.

The foregoing descriptions of FIGS. 3A-3C-2 provided above are intended to augment the description provided in reference to FIGS. 1A to 2D. While terms in the following description may not be identical to terms used in the foregoing description, a person having ordinary skill in the art would understand these terms to have the same meaning.

FIG. 4 shows a flow chart illustrating an example method 400 of optimizing a display location for displaying AR content using AR glasses, in accordance with some embodiments.

(A1) In accordance with some embodiments of the present disclosure, the method 400 is performed at (410) an AR glasses device having a lens display for displaying AR content within a portion, less than all, of the AR device.

The method 400 includes determining (420), based on imaging data obtained about physical surroundings of the AR glasses, whether to present the AR content at an optimized display location.

The method 400 includes, in accordance with determining that the physical surroundings satisfy one or more safety criteria, causing (460) display of the AR content at the optimized display location.

(A2) In some embodiments of A1, the optimized display location is based on an angle of rotation of the AR glasses device (430). For example, FIGS. 2B and 2C show AR content being presented at two distinct display locations within the lens of an AR glasses device based on an angle of rotation of the AR glasses device.

(A3) In some embodiments of A1 or A2, the optimized display location is offset towards the center of the AR glasses device (440). For example, FIG. 1D shows a second display position 112 for presenting AR content that is offset horizontally towards a temple of the AR glasses device 128.

(A4) In some embodiments of any one of A1 to A3, the optimized display location is identified within a predefined safe display space within the lens of the AR glasses device (450). For example, FIGS. 1A to 1D illustrate a safe display space 106 for presenting AR content with the AR glasses device 228.

(B1) In accordance with some embodiments a method is provided for optimizing a display location of augmented-reality (AR) content based on a set of viewing criteria. Operations of the method are performed at an AR device having a lens display for displaying the AR content within a portion, less than all, of a lens of the AR device.

The method includes determining, based on imaging data obtained about physical surroundings of the AR device, whether to present the AR content at an optimized display location of the lens of the AR device. The optimized display location is determined based on: (i) minimizing an occlusion factor with respect to real-world surroundings of a user of the AR device; (ii) increasing depth-switching demands of the user; (iii) minimizing eye strain of the user by limiting an angular distance of the AR content from a resting gaze of an eye of the user; and (iv) optimizing an eyebox position of the AR content such that an amount of AR content subject to display clipping based on fitment factors of individual users is minimized.

The method includes, in accordance with determining that the physical surroundings satisfy one or more viewing criteria, causing display of the AR content at the optimized display location.

(B2) In some embodiments of B1, lenses of the AR device includes a 7-degree angle of pantoscopic tilt to maximize a fitment of the AR device based on a set of fitment factors, including: (i) an ear-to-nose height associated with a vertical line of sight of the user; (ii) a nose-bridge fit associated with the vertical line of sight of the user; (iii) an eye and head symmetry associated with a horizontal line of sight of the user; and (iv) a wear variability associated with both the vertical and horizontal lines of sight of the user.

(B3) In some embodiments of B1 or B2, the optimized display location is identified within a predefined safe display space within the lens of the AR device, and the eyebox position of the AR content is positioned to maximize a range of angles that cause the AR content to be fully contained by the predefined safe display space in order to prevent display clipping caused by changes in viewing angle.

(B4) In some embodiments of any one of B1 to B3, the AR device is a monocular lens display device configured to present AR content within a single lens of the AR device, and the AR content is presented at the monocular lens.

(B5) In some embodiments of any one of B1 to B4, the viewing criteria include one or more of: (i) a first criterion that is satisfied based on a determination that the optimized display location does not occlude a conversation partner that the user is currently interacting with; (ii) a second criterion that is satisfied based on a determination that a wearer of the AR device has a gaze direction within a predefined vertical gaze range; (iii) a third criterion that is satisfied based on a determination that the wearer of the AR device has a gaze direction within a predefined horizontal gaze range; and (iv) a fourth criterion that is satisfied based on a determination that the wearer of the AR device would view the AR content from within a predefined focal length range based on the optimized display location.

(B6) In some embodiments of any one of B1 to B5, optimized display location is based on an angle of rotation of the AR device.

(B7) In some embodiments of any one of B1 to B6, the optimized display location is offset towards the center of the AR device.

Any data collection performed by the devices described herein and/or any devices configured to perform or cause the performance of the different embodiments described above in reference to any of the Figures, hereinafter the "devices," is done with user consent and in a manner that is consistent with all applicable privacy laws. Users are given options to allow the devices to collect data, as well as the option to limit or deny collection of data by the devices. A user is able to opt-in or opt-out of any data collection at any time. Further, users are given the option to request the removal of any collected data.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all potential combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of optimizing a display location of augmented-reality (AR) content based on a set of viewing criteria, comprising:

at an AR device having a display for displaying the AR content within a portion, less than all, of a lens of the AR device:

determining, based on imaging data obtained about physical surroundings of the AR device, whether to present the AR content at an optimized display location of the lens of the AR device, wherein the optimized display location is determined based on:

minimizing an occlusion factor with respect to real-world surroundings of a user of the AR device, increasing depth-switching demands of the user, minimizing eye strain of the user by limiting an angular distance of the AR content from a resting gaze of an eye of the user, and optimizing an eyebox position of the AR content such that an amount of AR content subject to display clipping based on fitment factors of individual users is minimized; and in accordance with determining that the physical surroundings satisfy one or more viewing criteria, causing display of the AR content at the optimized display location.

2. The method of claim 1, wherein the lens of the AR device includes a 7-degree angle of pantoscopic tilt to maximize a fitment of the AR device based on a set of fitment factors, including:

an ear-to-nose height associated with a vertical line of sight of the user, a nose-bridge fit associated with the vertical line of sight of the user, an eye and head symmetry associated with a horizontal line of sight of the user, and a wear variability associated with both the vertical and horizontal lines of sight of the user.

3. The method of claim 1, wherein:

the optimized display location is identified within a predefined safe display space within the lens of the AR device, and the eyebox position of the AR content is positioned to maximize a range of angles that cause the AR content to be fully contained by the predefined safe display space in order to prevent display clipping caused by changes in viewing angle.

4. The method of claim 1, wherein:

the AR device is a monocular display device configured to present AR content within a single lens of the AR device, and the AR content is presented at a monocular lens.

5. The method of claim 1, wherein the viewing criteria include one or more of:

a first criterion that is satisfied based on a determination that the optimized display location does not occlude a conversation partner that the user is currently interacting with;

a second criterion that is satisfied based on a determination that the user of the AR device has a gaze direction within a predefined vertical gaze range;

a third criterion that is satisfied based on a determination that the user of the AR device has a gaze direction within a predefined horizontal gaze range; and a fourth criterion that is satisfied based on a determination that the user of the AR device would view the AR content from within a predefined focal length range based on the optimized display location.

6. The method of claim 1, wherein the optimized display location is based on an angle of rotation of the AR device.

7. The method of claim 1, wherein the optimized display location is offset towards the center of the AR device.

8. A system, comprising:

one or more processors; and memory, comprising instructions that, when executed by the one or more processors, cause operations comprising:

at an AR device having a display for displaying AR content within a portion, less than all, of a lens of the AR device:

determining, based on imaging data obtained about physical surroundings of the AR device, whether to present the AR content at an optimized display location of the lens of the AR device, wherein the optimized display location is determined based on:

minimizing an occlusion factor with respect to real-world surroundings of a user of the AR device, increasing depth-switching demands of the user, minimizing eye strain of the user by limiting an angular distance of the AR content from a resting gaze of an eye of the user, and optimizing an eyebox position of the AR content such that an amount of AR content subject to display clipping based on fitment factors of individual users is minimized; and in accordance with determining that the physical surroundings satisfy one or more viewing criteria, causing display of the AR content at the optimized display location.

9. The system of claim 8, wherein the lens of the AR device includes a 7-degree angle of pantoscopic tilt to maximize a fitment of the AR device based on a set of fitment factors, including:

an ear-to-nose height associated with a vertical line of sight of the user, a nose-bridge fit associated with the vertical line of sight of the user, an eye and head symmetry associated with a horizontal line of sight of the user, and a wear variability associated with both the vertical and horizontal lines of sight of the user.

10. The system of claim 8, wherein:

the optimized display location is identified within a predefined safe display space within the lens of the AR device, and the eyebox position of the AR content is positioned to maximize a range of angles that cause the AR content to be fully contained by the predefined safe display space in order to prevent display clipping caused by changes in viewing angle.

11. The system of claim 8, wherein:

the AR device is a monocular display device configured to present AR content within a single lens of the AR device, and the AR content is presented at a monocular lens.

12. The system of claim 8, wherein the viewing criteria include one or more of:

a first criterion that is satisfied based on a determination that the optimized display location does not occlude a conversation partner that the user is currently interacting with;

a second criterion that is satisfied based on a determination that the user of the AR device has a gaze direction within a predefined vertical gaze range;

a third criterion that is satisfied based on a determination that the user of the AR device has a gaze direction within a predefined horizontal gaze range; and a fourth criterion that is satisfied based on a determination that the user of the AR device would view the AR content from within a predefined focal length range based on the optimized display location.

13. The system of claim 8, wherein the optimized display location is based on an angle of rotation of the AR device.

14. The system of claim 8, wherein the optimized display location is offset towards the center of the AR device.

15. A non-transitory computer-readable storage medium comprising instructions that, when executed by one or more processors, cause operations comprising:

at an AR device having a display for displaying AR content within a portion, less than all, of a lens of the AR device:

determining, based on imaging data obtained about physical surroundings of the AR device, whether to present the AR content at an optimized display location of the lens of the AR device, wherein the optimized display location is determined based on:

minimizing an occlusion factor with respect to real-world surroundings of a user of the AR device, increasing depth-switching demands of the user, minimizing eye strain of the user by limiting an angular distance of the AR content from a resting gaze of an eye of the user, and optimizing an eyebox position of the AR content such that an amount of AR content subject to display clipping based on fitment factors of individual users is minimized; and in accordance with determining that the physical surroundings satisfy one or more viewing criteria, causing display of the AR content at the optimized display location.

16. The non-transitory computer-readable storage medium of claim 15, wherein the lens of the AR device includes a 7-degree angle of pantoscopic tilt to maximize a fitment of the AR device based on a set of fitment factors, including:

an ear-to-nose height associated with a vertical line of sight of the user, a nose-bridge fit associated with the vertical line of sight of the user, an eye and head symmetry associated with a horizontal line of sight of the user, and a wear variability associated with both the vertical and horizontal lines of sight of the user.

17. The non-transitory computer-readable storage medium of claim 15, wherein:

the optimized display location is identified within a predefined safe display space within the lens of the AR device, and the eyebox position of the AR content is positioned to maximize a range of angles that cause the AR content to be fully contained by the predefined safe display space in order to prevent display clipping caused by changes in viewing angle.

18. The non-transitory computer-readable storage medium of claim 15, wherein:

the AR device is a monocular display device configured to present AR content within a single lens of the AR device, and the AR content is presented at a monocular lens.

19. The non-transitory computer-readable storage medium of claim 15, wherein the viewing criteria include one or more of:

a first criterion that is satisfied based on a determination that the optimized display location does not occlude a conversation partner that the user is currently interacting with;

a second criterion that is satisfied based on a determination that the user of the AR device has a gaze direction within a predefined vertical gaze range;

a third criterion that is satisfied based on a determination that the user of the AR device has a gaze direction within a predefined horizontal gaze range; and a fourth criterion that is satisfied based on a determination that the user of the AR device would view the AR content from within a predefined focal length range based on the optimized display location.

20. The non-transitory computer-readable storage medium of claim 15, wherein the optimized display location is based on an angle of rotation of the AR device.

* * * * *